United States Patent [19]

Dunbar

[11] Patent Number: 5,388,933
[45] Date of Patent: Feb. 14, 1995

[54] TOOL FOR CENTERING A PUNCH OR DRILL ON A STUD'S BROKEN FACE

[76] Inventor: David Dunbar, P.O. Box 390380, Anza, Calif. 92539

[21] Appl. No.: 214,981

[22] Filed: Mar. 21, 1994

[51] Int. Cl.⁶ .................... B23B 41/00; B23B 49/00
[52] U.S. Cl. .................... 408/72 B; 408/80; 408/84; 408/115 B
[58] Field of Search .............. 408/79, 80, 81, 72 B, 408/115 R, 115 B, 241 B, 84; 279/2.1, 2.17; 81/53.2; 29/426.4

[56] References Cited

U.S. PATENT DOCUMENTS

| | | | |
|---|---|---|---|
| 1,458,076 | 6/1922 | Potts . | |
| 2,165,485 | 7/1939 | Jackman | 72/62 |
| 2,391,405 | 12/1945 | Fuglie | 29/148 |
| 2,779,218 | 1/1957 | Edgerton | 408/110 |
| 3,439,567 | 4/1969 | Denis | 81/53 |
| 3,508,321 | 4/1970 | Wood | 29/427 |
| 3,999,452 | 12/1976 | Larsen | 408/80 |
| 4,759,666 | 7/1988 | Grab | 408/115 B |
| 4,831,902 | 5/1989 | McClure | 81/53.2 |
| 4,940,370 | 7/1990 | Gipson | 408/72 R |
| 5,154,548 | 10/1992 | Walsh | 408/241 B |

Primary Examiner—Daniel W. Howell
Attorney, Agent, or Firm—Calif Tervo

[57] ABSTRACT

A tool, for preparing broken stud bolts or the like for extraction by screw extractors and more specifically is a guide for centering a center punch and/or a drill on a the broken face of a stud, comprises a nut and a shaft assembly. The nut has a central bore therethrough having a first portion threaded to mate with the stud threads and a second portion bored to just slide over the stud threads. The shaft assembly has a cylindrical shaft having a first end and a second end and an axial bore therethrough. The shaft includes a first externally threaded portion extending from the shaft first end of threads similar to those of the broken stud and an expandable sleeve attached to the shaft second end such that threading movement of the nut toward the shaft second end axially compresses the sleeve whereby the sleeve expands radially outward. The second end of the shaft has a conical end face. The shaft assembly and nut can be used in a variety of configurations that center the axial bore of the shaft over the stud's broken end face so that a drill or center punch can be inserted in the shaft's axial bore.

10 Claims, 1 Drawing Sheet

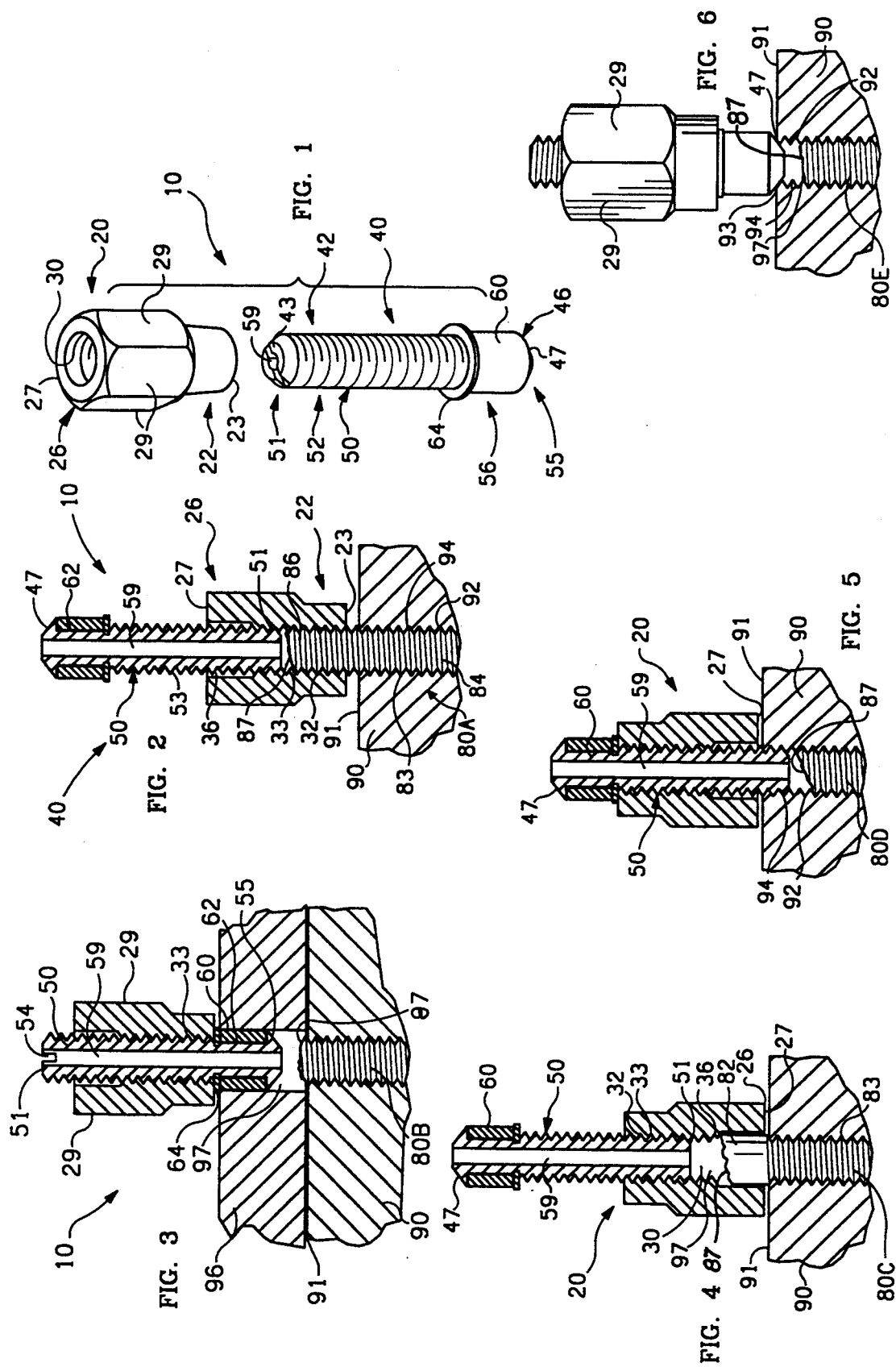

TOOL FOR CENTERING A PUNCH OR DRILL ON A STUD'S BROKEN FACE

BACKGROUND OF THE INVENTION

1. Field of the Invention

This invention is a tool for preparing broken stud bolts or the like for extraction by screw extractors and more specifically is a guide for centering a center punch and/or a drill on a the broken face of a stud.

2. Background of the Invention

When a stud bolt bolts breaks off, it leaves, in the threaded bore, a threaded portion which must be removed prior to insertion of a new stud. Typically, the remaining portion is removed by drilling into the stud's broken face, by driving or screwing an extractor into the drilled hole to engage the stud remnant and, then, by turning the extractor to unscrew the remnant from the hole.

It is highly desirable that the hole be drilled axially for several reasons. First, drilling an off-center hole may damage the bore threads. Second, an axial hole helps prevent extractor breakage. An axial hole allows use of the largest possible drill, without damaging the threads, which, in turn, allows use of the largest possible extractor. Also, an extractor is less likely to be broken because less force needs to be applied to an extractor in an axial hole to provide the necessary extraction torque.

However, the typical rough and slanted broken face of a stud makes drilling an axial hole difficult.

Additionally, stud bolts break off in a variety of positions: far into the bore, in the bore near the orifice, at a threaded portion outside the bore, at a shank portion outside the bore or in the larger bore of an attached captive piece.

Therefore, it is desirable to have a tool for guiding of a center punch and/or drill into engagement with a stud's broken face regardless of the location of the break.

SUMMARY OF THE INVENTION

This invention is a tool for preparing broken stud bolts or the like for extraction by screw extractors and more specifically is a guide for centering a center punch and/or a drill on a the broken face of a stud. In an exemplary embodiment, the tool comprises a nut and a shaft assembly. The nut has a central bore therethrough having a first portion threaded to mate with the stud threads and a second portion bored to just slide over the stud threads. The shaft assembly has a cylindrical shaft having a first end and a second end and an axial bore therethrough. The shaft includes a first externally threaded portion extending from the shaft first end of threads similar to those of the broken stud and an expandable sleeve attached to the shaft second end such that threading movement of the nut toward the shaft second end axially compresses the sleeve whereby the sleeve expands radially outward. The second end of the shaft has a conical end face.

The shaft assembly and nut can be used in a variety of configurations that center the axial bore of the shaft over the stud's broken end face so that a drill or center punch can be inserted in the shaft's axial bore.

Other features and many attendant advantages of the invention will become more apparent upon a reading of the following detailed description together with the drawings in which like reference numerals refer to like parts throughout.

BRIEF DESCRIPTION OF THE DRAWINGS

FIG. 1 is an elevated exploded perspective view of a preferred embodiment of the tool of the invention.

FIG. 2 is a longitudinal cross-sectional view of the tool attached to a broken stud having exposed threads.

FIG. 3 is longitudinal cross-sectional view of the tool centered in the bore of a captive part.

FIG. 4 is a longitudinal cross-sectional view of the tool centered around a stud maximum diameter.

FIG. 5 is a longitudinal cross-sectional view of the tool threaded in bore.

FIG. 6 is a side view of the tool centered in the entrance of a bore containing a broken stud (shown in cross-section).

DETAILED DESCRIPTION OF THE INVENTION

With reference now to the drawings, Figure is an elevated exploded perspective view of a preferred embodiment of the tool, denoted generally as 10, of the invention. In general, tool 10 comprises a nut, denoted generally as 20, and a shaft assembly, denoted generally as 40.

Nut 20 has a first end 22, having an end face 23, a second end 26, having an end face 27, and a central bore 30 therebetween.

Shaft assembly 40 has a first end 42, having an end face 43, and a second end 46, having an end face 47. In general, shaft assembly 40 includes a cylindrical shaft 50 having a first end 51 defining the shaft assembly first end 42, a second end 55 and an axial bore 59 therebetween. Shaft 50 includes a first portion 52 extending from shaft first end 51 toward shaft second end 55. Shaft first portion 52 includes external threads 53, preferably matching those of a stud to be removed. Shaft 50 includes a second portion 56 extending from shaft second end 55 toward shaft first end 51. An expandable sleeve 60 is attached to shaft second portion 56.

FIGS. 2-6 show the use of tool 10 with various possible configurations of a broken stud 80A-E Turning now to FIG. 2, there is shown a longitudinal cross-sectional view of tool 10 attached to the broken end 80A of a stud. A block of metal, such as engine block 90, has a surface 91 and includes a bore 92 having internal threads 94 in which the broken end (broken stud 80A) of a stud is lodged. Broken stud 80A has external threads 83, an inner end 84 and an outer end 86 having a broken end face 87. Broken stud 80A has an outer end 86 that protrudes above surface 91 of block 90 and that is threaded to broken end face 87. If a stud is broken in this configuration, the best manner to use tool 10 is now described.

The Central bore 30 of nut 20 includes a first portion 32 extending from nut first end 22 toward nut second end 26 including internal threads 33 and a second portion 36 extending from nut second end 26 to internal threads 33. Nut second portion 36 is bored to just freely slide over external threads that would threadably engage nut internal threads 33, e.g. shaft threads 53 and stud threads 83. With nut first end 22 facing broken stud 80A, some nut internal threads 33 are threaded on outer end 86 of stud 80A. First end 51 of shaft 50 is inserted from nut second end 26 into bore second portion 36 and threads 53 threaded onto some of the remaining threads 33 of first portion 32. Axial bore 59 is now centered on broken end face 87. An axial hole can be drilled in broken end face 87 by inserting a drill through axial bore 59. Also, a center punch can be inserted into bore 59 for center punching end face 87.

FIG. 3 is longitudinal cross-sectional view of tool 10 centered in the bore 97 of a captive part, such as exhaust manifold 96. This is a common situation in which broken stud 80B is one of the studs that holds attached piece 96 captive breaks and it is desirable to remove broken stud 80B without removing piece 96 because removing piece 96 requires removal of all of the other studs. In this situation, expandable sleeve 60 is inserted in bore 97 of manifold 96. Nut internal threads 33 are threadably engaged with shaft threads 53 and nut 20 is screwed toward shaft second end 55 and axially compresses sleeve 60 whereby sleeve 60 expands radially outward and becomes lodged in bore 97. Sleeve 60 may be made of any suitable material. A sleeve 60 made of polyurethane has proven satisfactory. Sleeve 60 includes an inner bore 62 that is freely journaled over shaft 50. A metal washer 64 between sleeve 60 and nut 20 is a bearing surface so that nut 20 does not turn sleeve 60. Nut 20 includes gripping means, such as external flats, such a hexagonal flats 29, for gripping nut 20 such that a torque can be applied to nut 20. Shaft assembly 40 includes engaging means, such as slot 54 for receiving a screw driver head or other engaging means of a tool for applying torque to shaft 50.

FIG. 4 is a longitudinal cross-sectional view of tool 10 centered around the shaft portion 82 of broken stud 80C. Broken stud 80C is broken through a shaft portion 82 which has a diameter of substantially that of the maximum diameter of stud threads. Second portion 36 of nut bore 30 is slid over stud shaft 82. This centers bore 30 on end face 97. Shaft 50 is screwed into nut bore first portion 32 until first end 51 is near broken end face 97.

FIG. 5 is a longitudinal cross-sectional view of the tool 10 centered on broken stud 80D which is broken off in bore 92 of block 90. In this configuration, nut 20 is typically removed from shaft assembly 40 and shaft first end 51 is simply screwed into bore 92 with shaft threads 53 engaging bore threads 94. Alternatively, if only a few threads can be engaged, nut 20 may be attached to shaft 50 as shown and screwed down such that end face 27 encounters block surface 91. This holds shaft 50 more rigid during drilling or center punching.

FIG. 6 is a side view of tool 10 centered in the entrance 93 of bore 92 containing broken stud 80E (shown in cross section). Second end 55 of shaft 50 has a conical end face 47 having a diameter larger that the diameter of external threads 53 and bore 92 such that it will center in entrance 93. Nut 20 is threaded on shaft 50 so that it can be held by a pliers or other tool during drilling or center punching. This method is primarily used, instead of the method of FIG. 5, when stud 80E is broken too near surface 91 such that too few threads 94 may be engaged by shaft 50 to hold it rigid.

Having described the invention, it can be seen that it provides a very convenient device for preparing broken stud bolts or the like for extraction by screw extractors by acting as a guide for centering a center punch and/or a drill on a the broken face of the stud.

Although a particular embodiment of the invention has been illustrated and described, various changes may be made in the form, composition, construction, and arrangement of the parts without sacrificing any of its advantages. Therefore, it is to be understood that all matter herein is to be interpreted as illustrative and not in any limiting sense, and it is intended to cover in the appended claims such modifications as come within the true spirit and scope of the invention.

I claim:

1. A tool comprising:
 a nut including:
  a central bore including:
   internal threads; and
 a shaft assembly having a first end and a second end; said shaft assembly including:
  a cylindrical shaft having a first end defining said shaft assembly first end and a second end; said shaft including:
   an axial bore therethrough;
   a first portion extending from said shaft first end toward said shaft second end including:
    external threads threadably engaged with said internal threads of said nut:
   a second portion extending from said shaft second end toward said shaft first end; and
  an expandable sleeve attached to said shaft second portion such that threading movement of said nut toward said shaft second end may axially compress said sleeve and such that axial compression of said sleeve expands said sleeve radially outward.

2. The tool of claim 1 wherein:
 said second end of said shaft assembly has a conical end face.

3. The tool of claim 1 wherein:
 said second end of said shaft has a conical end face.

4. The tool of claim 1 including:
 engagement means on said shaft first end for applying torque to said shaft.

5. The tool of claim 1 including:
 engaging means on said nut for applying torque to said nut.

6. A tool comprising:
 a nut having a first end and a second end; said nut including:
  a central bore therethrough including:
   a first portion extending from said nut first end toward said nut second end including:
    internal threads; and
   a second portion extending from said nut second end to said internal threads; said second portion bored to freely slide over external threads that would threadably engage said internal threads; and
 a shaft assembly having a first end and a second end; said shaft assembly including:
  a cylindrical shaft having a first end defining said shaft assembly first end and a second end; said shaft including:
   an axial bore therethrough;
   a first portion extending from said shaft first end toward said shaft second end including:
    external threads threadably engaged with said internal threads of said nut:
   a second portion extending from said shaft second end toward said shaft first end; and
  an expandable sleeve attached to said shaft second portion such that threading movement of said nut toward said shaft second end may axially compress said sleeve and such that axial compression of said sleeve expands said sleeve radially outward.

7. The tool of claim 6 wherein:
said second end of said shaft assembly has a conical end face.
8. The tool of claim 6 wherein:
said second end of said shaft has a conical end face.
9. The tool of claim 6 including:
engaging means on said shaft first end for applying torque to said shaft.
10. The tool of claim 9 including:
engaging means on said nut for applying torque to said nut.

* * * * *